United States Patent [19]
Büttner

[11] Patent Number: 5,936,759
[45] Date of Patent: Aug. 10, 1999

[54] ARRANGEMENT FOR SHIFTING OPTICAL IMAGES BETWEEN INDIVIDUAL CHANNELS

[75] Inventor: Knut Büttner, Überlingen, Germany

[73] Assignee: Bodenseewerk Geratetechnik GmbH, Uberlingen, Germany

[21] Appl. No.: 09/027,910

[22] Filed: Feb. 23, 1998

[30] Foreign Application Priority Data

Feb. 25, 1997 [DD] German Dem. Rep. ............ 19707432

[51] Int. Cl.$^6$ .................................................. G02B 26/00
[52] U.S. Cl. ........................ 359/291; 359/618; 359/619; 359/627; 250/208.1
[58] Field of Search .................................. 359/290, 291, 359/298, 299, 300, 315, 247, 618, 619, 627, 630; 250/208.1, 208.2

[56] References Cited

U.S. PATENT DOCUMENTS

| 5,049,740 | 9/1991 | Pines et al. ............................. 250/235 |
| 5,119,454 | 6/1992 | McMahon ............................... 359/290 |
| 5,444,572 | 8/1995 | Gal et al. ................................. 359/619 |
| 5,448,395 | 9/1995 | Lopez et al. ............................. 359/224 |
| 5,519,206 | 5/1996 | Uwira .................................... 250/208.1 |
| 5,557,431 | 9/1996 | Pepper .................................... 359/300 |
| 5,596,185 | 1/1997 | Bross et al. ........................... 250/208.1 |
| 5,640,479 | 6/1997 | Hegg et al. ............................. 359/291 |
| 5,691,836 | 11/1997 | Clark ....................................... 359/247 |
| 5,726,795 | 3/1998 | Betin et al. .............................. 359/300 |

FOREIGN PATENT DOCUMENTS

| 0663770 A1 | 7/1995 | European Pat. Off. . |
| 43 38 390 A 1 | 11/1993 | Germany . |
| 44 02 775 C1 | 7/1995 | Germany . |
| 2 146 137 | 4/1985 | United Kingdom . |

OTHER PUBLICATIONS

William L. Wolfe Apr. 27, 1998, "Introduction To Infrared System Design".
Leo Beiser, Apr. 27, 1998 Nov. 1, 1995/vol. 34, No. 31/Applied Optics pp. 7307–7317, "Fundamental Architechture of Optical Scanning Systems".

Primary Examiner—Loha Ben
Attorney, Agent, or Firm—McDermott, Will & Emery

[57] ABSTRACT

The invention relates to an arrangement for shifting optical images between individual channels. A plurality of imaging optical systems adapted to image conjugately upon each other, in an associated shiftable optical channel, an associated plane and an intermediate image plane, comprise a micro-mechanical mirror system (mirror array) arranged in the intermediate image plane and having a grid of mirror elements adapted to be tilted and actuated. A further imaging optical system is adapted to image conjugately upon each other, in a common channel, the intermediate image plane and a plane associated with the common channel. The mirror elements of the micro-mechanical system are adapted to be actuated in such a manner, that they optically connect optionally one of the shiftable channels to the common channel.

9 Claims, 2 Drawing Sheets 5,936,759

ARRANGEMENT FOR SHIFTING OPTICAL IMAGES BETWEEN INDIVIDUAL CHANNELS

BACKGROUND OF THE INVENTION

This invention relates to an arrangement for shifting optical images between individual channels.

Such an arrangement can, for example, serve to observe individual sections of a field of view or other individual objects by each an optical system in individual optical channels and to guide in fast sequence the detected images to a common optical channel and, for example, to an image-resolving sensor located in the common optical channel. This is the function of an "optical multiplexer". However, such an arrangement can also serve to guide an image generated in the common optical channel to individual parallel channels. This is the function of an "optical demultiplexer".

Prior art arrangements of this type operate with rotating polygon mirrors. One disadvantage of such arrangements is that shifting only can be effected in one single sequence exactly predetermined. A further disadvantage is image blurring due to the movement of the polygon mirror. This image blurring limits the rotary speed of the polygon mirror and, thus, the possible shift frequency (multiplex rate).

Other prior art arrangements operate by displacing elements of the imaging optical system. Such displacement of elements of the imaging optical system also limits the multiplex rate due to the moments of inertia and the inertial forces of the elements to be displaced.

Furthermore, it is known to image individual objects through individual optical channels or paths and a common lens system upon a single detector, the individual optical channels or paths being shifted individually. This requires a large numerical aperture of the common lens system. In addition, problems arise due to scattered light. EP-A-0 469 293 describes a micro-mechanical mirror system having a plurality of electrically actuated mirror elements. A similar micro-mechanical mirror system is described in EP-A-0 657 760.

SUMMARY OF THE INVENTION

It is the object of the invention to provided an arrangement for shifting optical images between individual optical channels.

Another object of the invention is to provide an arrangment for shifting optical images between individual optical channels with high speed.

Still another object of the invention is to provide an arrangment for shifting optical images between individual optical channels without image blurring.

Still another object of the invention is to provide an arrangment for shifting optical images between individual optical channels, by means of which the shifting between the optical channels can be effected in arbitrary sequence.

Still another object of the invention is to provide an arrangment for shifting optical images between individual optical channels, by means of which the problems of prior art arrangements arising due to large masses or the necessity of a large numerical aperture are avoided.

These and other objects are achieved by an arrangement for shifting optical images between individual channels, comprising: a plurality of imaging optical systems adapted to image conjugately upon each other, in an associated shiftable optical channel, an associated plane and an intermediate image plane; a micro-mechanical mirror system (mirror array) arranged in said intermediate image plane and having a grid of mirror elements adapted to be tilted and actuated; a further imaging optical system having an optical axis and adapted to image conjugately upon each other, in a common channel, said intermediate image plane and a plane associated with said common channel; and actuating means for actuating said mirror elements of said micro-mechanical system in such a manner, that said mirror elements optically connect optionally one of said shiftable channels to said common channel.

Each of the imaging optical systems in the shiftable channels generates, for example, a real image of the associated plane in the intermediate image plane. The micro-mechanical mirror system reflects the image from one of the shiftable channels into the common channel and the further optical system images the image in the plane associated with the common channel. The intermediate image on the micro-mechanical mirror system acts as a luminous image for the further optical system. Due to the fact, that a real image is generated on the micro-mechanical mirror system, there are no interfereces. Shifting from one of the shiftable channels to another by means of correspondingly actuating the mirror elements can be effected very fast and in arbitrary sequence of the channels. Inertial forces are neglectable. There are no image blurring. Using the same optical arrangement, by inversing the direction of the rays, also the plane associated with the common channel can be imaged consecutively on the planes associated with the individual shiftable channels.

Further objects and features of the invention will be apparent to a person skilled in the art from the following specification of a preferred embodiment when read in conjunction with the appended claims.

BRIEF DESCRIPTION OF THE DRAWING

The invention and its mode of operation will be more clearly understood from the following detailed description when read with the appended drawing in which.

DESCRIPTION OF THE PREFERRED EMBODIMENTS

Figure 1:
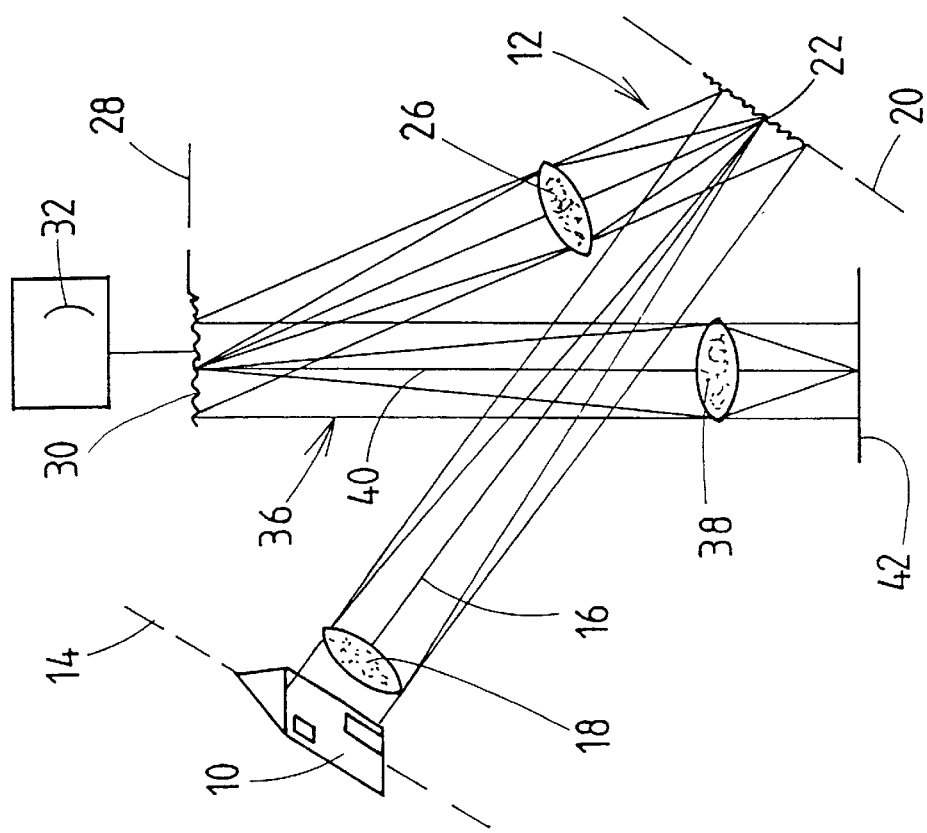
FIG. 1 shows a single imaging path of rays in a first embodiment of an arrangement for shifting optical images between individual channels.

Referring now to FIG. 1, there is shown an object, which is located in a plane 14 associated with the "shiftable" optical channel 12. The plane 14 can, for example, be located at infinity. The plane extends perpendicularly to the optical axis 16 of a first imaging optical sub-system 18. The optical sub-system 18 is illustrated by a lens in FIG. 1.

Figure 5:
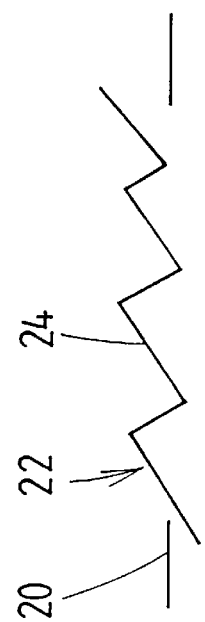
FIG. 5 shows, at enlarged scale, a mirror grating, which is used in the paths of rays of FIGS. 1 and 2.

The first optical sub-system 18 images the plane 14 in a mirror plane 20 (or inversely). A mirror grating of parallel mirror strips inclined with respect to the mirror plane 20 is located in the mirror plane 20. Such a mirror grating is schematically illustrated in FIG. 5 at enlarged scale.

A second imaging optical sub-system 26 images the mirror plane 20 in an intermediate image plane 28 (or inversely). The second imaging optical sub-system is likewise illustrated by a lens in FIG. 1. The mirror plane 20 and the intermediate image plane 28 are inclined relative to each other. The mirror plane 20 and the intermediate image plane 28 are not perpendicular to the optical axis of the second imaging optical sub-system. The mirror plane 20, the second imaging optical sub-system 26 and the intermediate image plane 28 are arranged relative to each other in a manner, such that Scheimpflug's condition is fulfilled: The mirror plane 20 and the intermediate image plane 28 intersect with the principal plane of the second imaging optical sub-system 26 in a straight line. When Scheimpflug's condition is fulfilled, the mirror grating 22 reflects the imaging light beam from the first imaging optical sub-system to the second imaging optical sub-system. In this way, the sharp real image of the object generated on the mirror grating 22 is sharply imaged in the intermediate image plane 28.

The sharp real image of the object 10 generated in the mirror plane acts as a luminous object for the second imaging optical sub-system 26. All of the mirror strips 24 of the mirror grating 22 are substantially located in the plane of sharpness of this image. However, the imaging light beam is reflected in a direction towards the second imaging optical sub-system. No interferences appear, because a real image is generated in the plane of the mirror grating 22.

Figure 4:
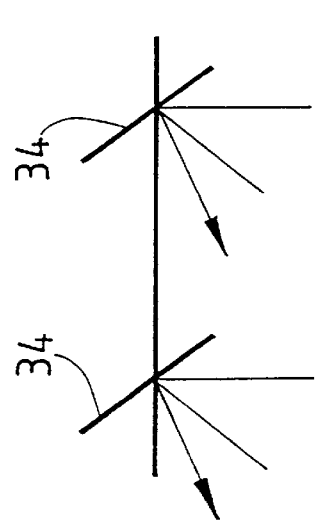
FIG. 4 shows the micro-mechanical mirror system of FIG. 3 in another shift position.
Figure 3:
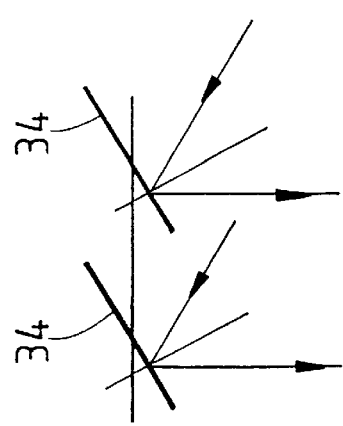
FIG. 3 shows is a schematic partial view at enlarged scale of a micro-mechanical mirror system, which is used in the embodiment of FIGS. 1 and 2, the micro-mechanical mirror system being in a shift position corresponding to FIG. 1.

A micro-mechanical mirror system 30 is located in the intermediate image plane. This micro-mechanical mirror system can be designed according to the above mentioned EP-A-0 469 293 or EP-A-0 657 760. The mirror system 30 consists of a two-dimensional grid of mirror elements 34 (FIGS. 3 and 4). The mirror elements 34 can be actuated by an actuating circuit 32. This is known per se and therefore not illustrated in detail herein. In the present embodiment, all of the mirror elements 34 are actuated in the same way. In the position of the mirror elements 34 in FIGS. 1 and 3, the mirror elements 34 are orientated to reflect the imaging light beam in a "common" optical channel 36 in a direction towards a further imaging optical system 38 along its optical axis 40. The further imaging optical system 38 sharply images the micro-mechanical mirror system 30 in a plane 42. The plane 42 is the plane associated with the common optical channel 36.

The sharp image generated in the intermediate image plane 28 on the micro-mechanical mirror system 30 acts as a luminous object for the further imaging optical system 38. The mirror elements 34 are practically located in the plane of sharpness of the image. The mirror elements 34 are orientated such that they guide the energy of the imaging light beam to the further imaging optical system 38.

The direction of the rays can, of course, also be inverted: An object located in the plane 42 can be imaged through intermediate images in the intermediate image plane 28 and the mirror plane 20 in the plane 14.

Figure 2:
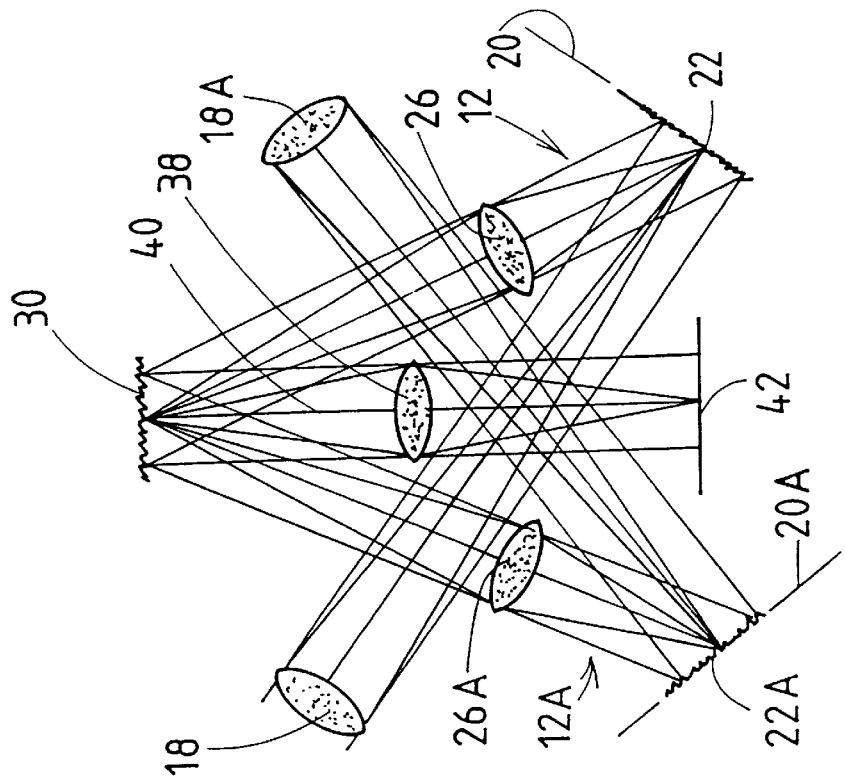
FIG. 2 shows an arrangement for shifting optical images between two individual channels operating with imaging paths of rays according to FIG. 1.

FIG. 1 shows the path of rays for one channel 12 and the common channel 36. In addition to the channel 12, further channels are adapted to be optionally optically connected in a corresponding manner to the common channel 36 by the micro-mechanical mirror system 30. FIG. 2 shows the arrangement with two shiftable channels 12 and 12A. The optical design of the channel 12A corresponds mirror-invertly to the channel 12. Corresponding elements in the channel 12A are designated by the same reference numerals as in the channel 12, but additionally marked by "A".

The micro-mechanical mirror system 30 is adjustable in order to shift the channels between two positions, which are illustrated in FIGS. 3 and 4. In the position illustrated in FIG. 3, the imaging light beam is guided from the channel 12 into the common channel 36. The image of an object detected by the imaging optical sub-system 18 in the associated plane 14 is generated in the plane 42. In the position illustrated in FIG. 4, the imaging light beam is guided from the channel 12A into the common channel 36. The image of an object detected by the imaging optical sub-system 18A in the associated plane is generated in the plane 42.

In the same manner, more than two shiftable channels can be arranged about the optical axis 40 of the imaging optical system 38, for example two further channels in the plane perpendicular to the paper plane of FIG. 2. A section taken along a plane containing the optical axis 40 and being perpendicular to the paper plane would then look the same way as FIG. 2. In this case, the mirror elements 34 of the micro-mechanical mirror system have to be arranged to be tilted about two axes.

Due to the symmetric arrangement of the micro-mechanical mirror system 30 with respect to the optical axis 40 of the imaging optical system 38 and the symmetric arrangement of the channels 12 and 12A, there are no vignetting of the imaging light beam.

Figure 6:
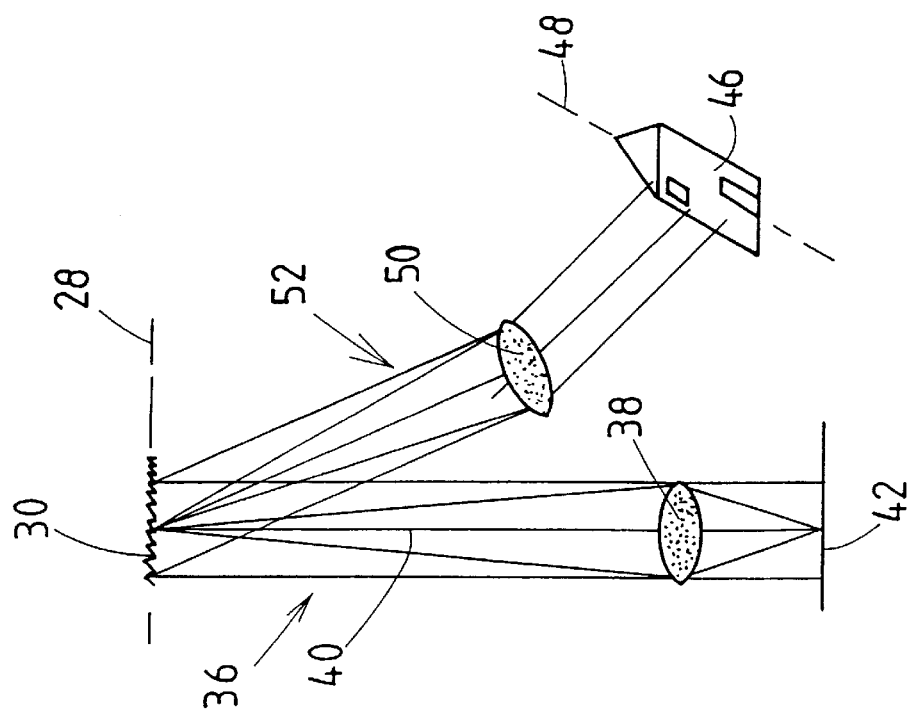
FIG. 6 shows a single imaging path of rays in a second embodiment of an arrangement for shifting optical images between two individual channels.

FIG. 6 shows a "shiftable" channel and the common channel in a modified embodiment.

In the embodiment of FIG. 6, an object 46 in a plane 48 is imaged by an imaging optical system 50 in the intermediate image plane 28. Here, the imaging optical system 50 is a decentered lens system. This makes it possible to do without a further intermediate image as in the "mirror plane" of FIGS. 1 and 2. The plane 48 is directly imaged upon the intermediate image plane 28. The micro-mechanical mirror system and the common channel correspond to those in FIGS. 1 and 2. Therefore, corresponding elements are designated by the same reference numerals in FIG. 6 as in FIGS. 1 and 2. The imaging optical system 50 constitutes one channel 52 of the "shiftable" optical channels. Several such shiftable channels are arranged about the optical axis 40 of the imaging optical system 38.

The described optical multiplexers or demultiplexers can be used in several different applications.

An image-resolving sensor, for example a matrix sensor, can be arranged in the plane 42. Then, the individual shiftable channels 12, 12A . . . can observe different sectors of an extended field of view. Through the micro-mechanical mirror system 30, the different sectors can be consecutively detected in fast and, if required, variable sequence by the image-resolving sensor. In order to test infrared sensors in seeker heads of target-tracking missiles, it is required to generate quickly varying heat images in order to, for example, simulate a quickly movable hot target. It is difficult to generate heat images, which change quickly. The temperature of the surface element representing the heat image can not be changed quickly. Then, it is possible to generate different heat images changing just inertially in the planes associated with the individual channels 12, 12A . . . and to progress the channels by means of the micro-mechanical mirror system in order to simulate fast variations. In both cases, the "source" of the image information is located in the planes 14 of the shiftable channels, whereas a "sink" of the image information is located in the plane 42 associated with the common channel. The arrangement operates as "optical multiplexer".

However, it is also possible, by means of the micro-mechanical mirror system, to guide an object located in the plane 42 in fast sequence consecutively to the individual optical channels. This can, for example, be used to detect fast actions using image-resolving sensors, which are relatively sluggish. Such an image-resolving sensor can be arranged in each one of the planes associated with a shiftable optical channel, for example in the plane 14. A fast action can be detected by fast shifting in that each of the relatively sluggish image-resolving sensors just detects one phase of this action.

I claim:

1. An arrangement for shifting optical images between individual channels, comprising:

a plurality of imaging optical systems adapted to image conjugately upon each other, in an associated shiftable optical channel, an associated plane and an intermediate image plane;

a micro-mechanical mirror system (mirror array) arranged in said intermediate image plane and having a grid of mirror elements adapted to be tilted and actuated;

a further imaging optical system having an optical axis and adapted to image conjugately upon each other, in a common channel, said intermediate image plane and a plane associated with said common channel; and actuating means for actuating said mirror elements of said micro-mechanical mirror system in such a manner, that said mirror elements optically connect optionally one of said shiftable channels to said common channel.

2. The arrangement of claim 1, wherein said imaging optical systems of said shiftable optical channels comprise:

a first imaging optical sub-system adapted to image conjugately upon each other said plane associated with said corresponding channel and a mirror plane;

a mirror arrangement arranged in said mirror plane; and a second imaging optical sub-system adapted to image conjugately upon each other said mirror plane and said intermediate image plane.

3. The arrangement of claim 2, wherein:

said mirror plane, said second imaging optical sub-system and said intermediate image plane are arranged relative to each other in a position, in which Scheimpflug's condition is fulfilled; and said mirror arrangement forms a mirror grating of narrow mirror strips inclined with respect to said mirror plane and adapted to deflect an imaging path of rays from said first imaging optical sub-system to said second imaging optical sub-system and to said micro-mechanical mirror system located in said intermediate image plane.

4. The arrangement of claim 1, wherein said imaging optical systems of said shiftable optical channels each have a decentered lens system adapted to image directly conjugately upon each other said plane associated with said optical channel and said intermediate image plane.

5. The arrangement of claim 1, wherein said plurality of imaging optical systems each forming an optical channel is arranged about an axis extending perpendicularly to said intermediate image plane and forming said optical axis of said further imaging optical system, each of said imaging optical systems imaging an associated plane in said intermediate image plane.

6. The arrangement of claim 5, wherein each of said shiftable optical channels detects a sector of an extended field of view, said micro-mechanical mirror system shifting in fast sequence said individual shiftable channels to said common channel.

7. The arrangement of claim 1, wherein an image-resolving sensor is arranged in said plane associated with said common optical channel.

8. The arrangement of claim 7, wherein means generating test images are arranged in said planes associated with said shiftable channels, said micro-mechanical mirror system being adapted to shift in fast sequence said individual shiftable channels to said common channel.

9. The arrangement of claim 8, wherein:

an infrared image-resolving sensor is arranged in said plane associated with said common optical channel; and said means generating test images are adapted to generate heat images.

* * * * *